Aug. 22, 1939.　　　　C. S. ASH　　　　2,170,647
WHEEL CONSTRUCTION
Filed July 22, 1935　　　　3 Sheets-Sheet 1
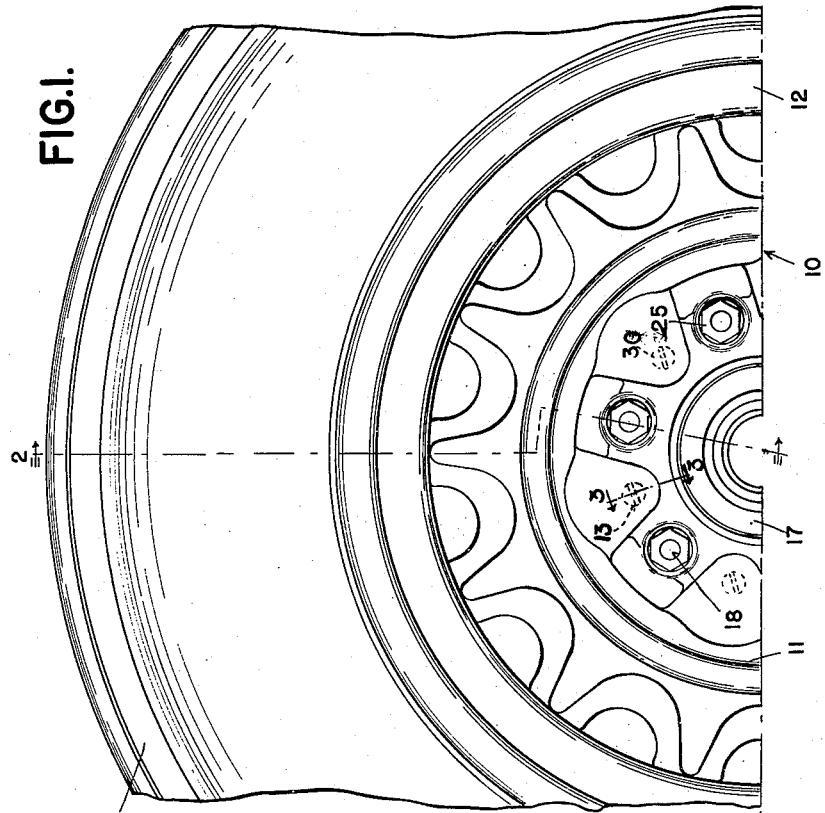
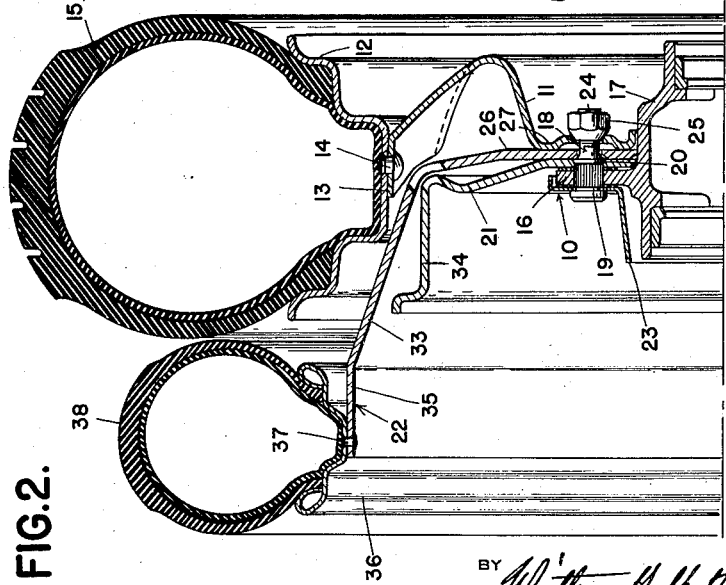
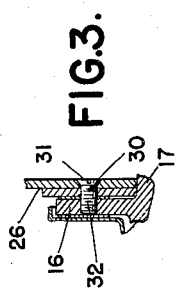
INVENTOR
CHARLES S. ASH
BY
ATTORNEYS Aug. 22, 1939.   C. S. ASH   2,170,647
WHEEL CONSTRUCTION
Filed July 22, 1935   3 Sheets-Sheet 2
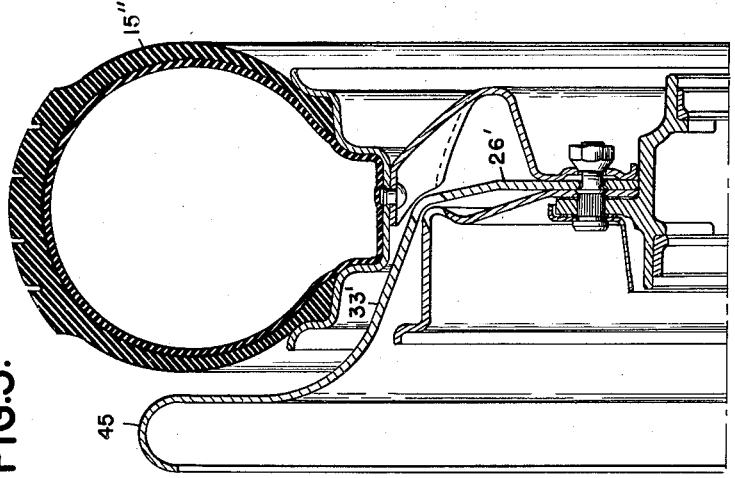
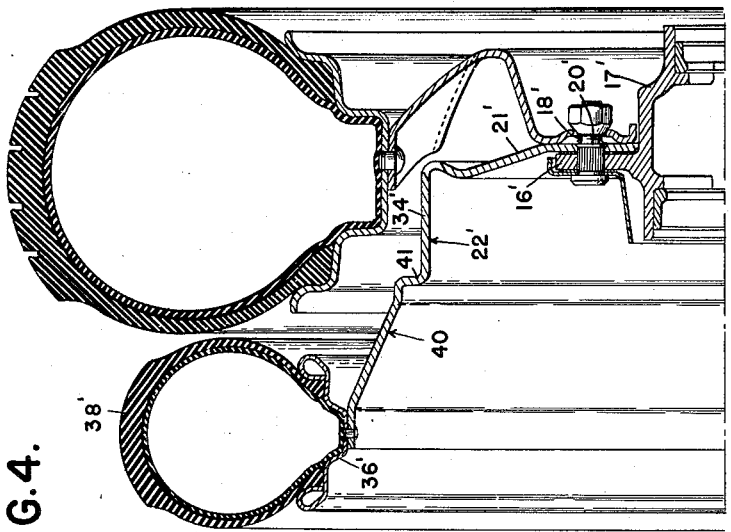
INVENTOR
CHARLES S. ASH
BY
ATTORNEYS Aug. 22, 1939.　　　　C. S. ASH　　　　2,170,647

WHEEL CONSTRUCTION

Filed July 22, 1935　　　3 Sheets-Sheet 3

INVENTOR
CHARLES S. ASH

BY

ATTORNEYS

Patented Aug. 22, 1939

2,170,647

UNITED STATES PATENT OFFICE 2,170,647

WHEEL CONSTRUCTION

Charles S. Ash, Milford, Mich., assignor to Kelsey-Hayes Wheel Company, Detroit, Mich., a corporation of Delaware Application July 22, 1935, Serial No. 32,640

3 Claims. (Cl. 301—39)

This invention relates generally to vehicle wheels and refers more particularly to wheels of the type commonly known in the art as safety or emergency wheels.

The liability of accidents resulting from blowouts or accidental deflation of pneumatic tired vehicle wheels is greatly aggravated by the steadily increasing demand for smaller diametered wheels equipped with pneumatic tires of relatively large cross sectional area owing to the increased distance the wheel drops upon accidental deflation of the tire carried thereby. It is, therefore, one of the principal objects of this invention to appreciably reduce the liabiilty of serious accidents resulting from the above, by providing vehicle wheels with a safety attachment embodying a tread positioned upon one side of the main road engaging pneumatic tire and having a diameter less than the main tire so as to be normally out of contact with the road, but sufficient to permit the tread to engage the road upon deflation of the main tire before the wheel drops to such an extent as to seriously affect control of the vehicle.

Another advantageous feature of the present invention resides in the provision of a safety attachment having a tire supporting body permanently or demountably secured to either the hub of the wheel or brake drum of the latter and fashioned to carry a tire of either the pneumatic, solid rubber, or metal type.

A further advantageous feature of this invention consists in the provision of a vehicle wheel of the type previously set forth wherein the auxiliary or safety wheel body is secured independent of the main wheel body, so that in the event the latter should become accidentally disengaged from the hub, the tire carried by the auxiliary wheel body would become active to engage the road.

The foregoing, as well as other objects, will be made more apparent as this description proceeds, especially when considered in connection with the accompanying drawings, wherein:

Figure 1 is a front elevation of a portion of a vehicle wheel constructed in accordance with this invention;

Figure 2 is a sectional view taken on the line 2—2 of Figure 1;

Figure 3 is a sectional view taken on the line 3—3 of Figure 1;

Figure 4 is a sectional view through a portion of a vehicle wheel showing a slightly modified form of construction;

Figure 5 is a sectional view through a portion of a vehicle wheel featuring a further modified form of construction;

Figure 6:
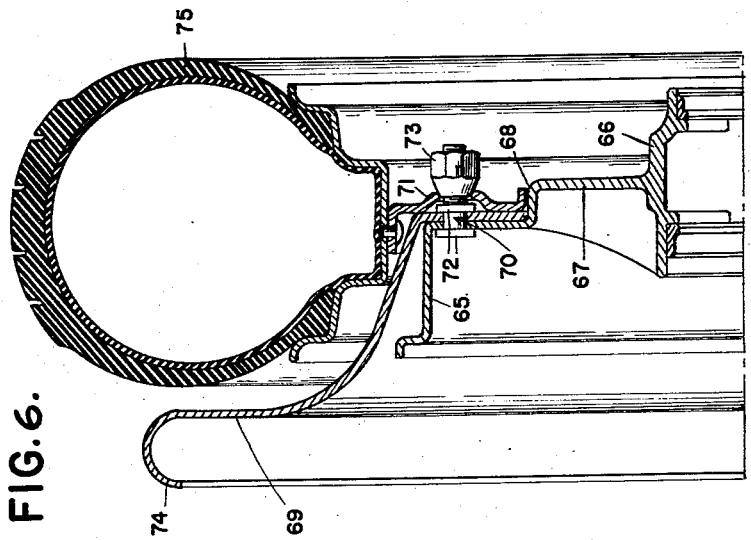
Figure 6 is a sectional view through another form of wheel construction.

Referring now to the drawings and with special reference to the embodiment of the invention illustrated in Figures 1 to 3 inclusive, it will be noted that the reference character 10 designates a vehicle wheel of relatively small diameter having a main wheel body 11 provided with a tire carrying rim 12 at the periphery thereof. While it will be apparent from the following description that the present invention is not limited to any particular type of wheel body, nevertheless, for the purpose of illustration I have shown a wheel body of the pressed metal spoked construction having an axially rearwardly extending flange 13 at the periphery thereof permanently secured to the base of the rim 12 through the medium of the rivets 14. Inasmuch as the rim 12 is permanently secured to the wheel body 11, the former is of the drop-center type in order to permit the pneumatic tire 15 carried thereby to be readily removed.

Also, for the purpose of illustration, the wheel body 11 is shown as demountably secured to an attaching flange 16 extending radially outwardly from the hub 17 of the wheel intermediate the ends thereof. The fastening means provided herein for demountably securing the wheel body 11 to the radial flange 16 of the hub 17 comprises a plurality of bolts 18 located in circumferentially spaced openings formed in the radial flange 16 and having axially spaced enlargements 19 and 20 disposed upon opposite sides of the radial flange 16. As shown particularly in Figure 2, the enlargements cooperate with each other to permanently secure the brake web 21 of the brake drum 22 to the front side of the radial flange 16, and incidentally function to permanently secure the lubricant shield 23 to the rear side of the radial flange 16. It will also be observed from the above figure that the bolts 18 are provided with threaded shank portions 24 extending forwardly from the enlargements 20 through aligned openings in the wheel body 11 and are adapted to receive clamping nuts 25.

As previously stated, one of the principal objects of the present invention is to provide a safety attachment for the wheel and this attachment is shown in Figure 2 as comprising a wheel body 26 centrally apertured to permit the same to be sleeved over the front end of the hub 17 and having a radial portion positioned between the web 21 of the brake drum and wheel body 11.

The aforesaid radial portion of the safety wheel body 26 is apertured to receive the threaded shank portions of the bolts 18 and is clamped to the front side of the web 21 of the brake drum by the portions 27 of the main wheel body 11. With the construction as thus far described, it will be seen that both the main and safety wheel bodies are secured to the hub 17 by the fastening means 18, and since it is also an object of the present invention to render the safety wheel operative to engage the road in the event the main wheel becomes accidentally disengaged from the hub 17, provision is made herein for securing the safety wheel body 26 to the inner hub 17 independent of the fastening means 18. As shown in Figure 3, the safety wheel body 26 is independently detachably secured to the radial flange 16 on the hub 17 by means of a plurality of fastener elements 30 positioned between the fastener elements 18. In the present instance, the fastener elements 30 are in the form of screws having head portions 31 located within countersunk openings formed in the safety wheel body 26 and having shank portions 32 extending rearwardly through openings in the web 21 of the brake drum 22 for threaded engagement with the flange 16.

As shown particularly in Figure 2, the safety wheel body 26 is provided with a portion 33 adapted to extend rearwardly through the space existing between the rim 12 and annular brake flange 34 of the brake drum. The portion 33 of the safety wheel body 26 terminates at its rear end in an axially extending seat 35 adapted to be permanently secured to a rim 36 through the medium of the rivets 37. In the present instance, the rim 36 is also shown as being of the drop-center type and as adapted to retain an auxiliary pneumatic tire 38. The auxiliary tire of the safety attachment is smaller in diameter than the main tire 15 so as to be normally out of contact with the road, but is of sufficient diameter to engage the road in the event the main tire should become accidentally deflated, or in the event the wheel body 11 should accidentally disengage from the hub 17.

The embodiment of the invention shown in Figure 4 differs principally from the foregoing construction in that the safety wheel body and brake drum are of one piece construction. In Figure 4 of the drawings, the safety wheel body is designated by the reference character 40 and, as shown in this figure, forms a continuation of the radially outwardly extending stiffening flange 41 at the rear end of the annular brake flange 34'. The extreme rear end of the safety wheel body 40 may be equipped with a drop-center rim 36' and an auxiliary pneumatic tire 38' in the same manner as the safety wheel body 26 in the first described form of the invention. It will also be observed from Figure 4 that the web 21' of the brake drum 22' is permanently secured to the front side of the radially extending flange 16' on the hub 17' by fastener elements 18' in the same manner as the web 21 is secured to the hub 17 in the foregoing construction. If desired, the enlargements 20' on the fastener bolts may be assisted in securing the brake drum and safety wheel assembly to the hub flange 16' by additional fastener elements similar to the means designated in Figure 3 by the reference character 30.

The modification disclosed in Figure 5 is identical in construction to the embodiment of the invention featured in Figures 1 to 3 inclusive, with the exception that the rim 36 and associated pneumatic tire 38 is eliminated. As will be observed from Figure 5, the extremity of the portion 33' of the safety wheel body 26' terminates in an annular ground engaging portion 45 having a diameter predetermined with respect to the maximum diameter of the main tire 15" so as to provide a support for the vehicle in the event of accidental deflation of the pneumatic tire 15".

In Figure 6 of the drawings, I have shown a wheel construction wherein the brake drum and hub are cast in one piece and wherein the rim as well as the safety attachment is secured to the web of the brake drum adjacent the periphery of the latter. In detail, the reference numeral 65 designates an annular brake flange integrally connected to the hub 66 by a web 67 having an annular forwardly extending seat 68 thereon for positioning both the rim and safety wheel attachment. The safety wheel attachment is designated by the reference character 69 and is permanently secured to the front side of the web 67 by means of the fastener elements 70. In the present instance, the rim is also demountably secured to the brake drum at the front side of the safety wheel attachment by the fastener elements 70 and in this connection, it is to be noted that the rim is provided with an inwardly extending flange or wheel body element 71 adapted to be positioned by the annular seat 68 into engagement with the front side of the safety wheel attachment.

Referring now more in detail to the fastener elements, it will be noted that the latter are provided with axially spaced enlargements 72 cooperating with each other to permanently secure the safety attachment 69 into engagement with the front side of the web 67 of the brake drum. It will be observed from Figure 6 that the fastener elements are provided with shank portions extending through openings in the wheel body element 71 for threadedly receiving the clamping nuts 73.

In the present instance, the safety wheel attachment is provided with a ground engaging portion 74 positioned upon the inner side of the main tire 75 on the rim for engaging the road in the event of accidental deflation of the tire 75, or in the event the rim should become accidentally disengaged from the wheel. In order to insure permanently securing the safety wheel attachment to the web of the brake drum, additional fastening means of the type defined in connection with the first embodiment of the invention may be provided between the fastener elements 70.

Although four different embodiments of the invention have been shown and described herein, nevertheless, it will be noted from the foregoing description that each wheel construction is equipped with a safety wheel attachment of such a nature as to engage the road in the event the main pneumatic tire is accidentally deflated, or in the event the same becomes accidentally disengaged from the wheel. In addition, it will be noted that the foregoing advantageous feature is incorporated in the wheel structure without departing radically from standard practice and without complicating or unduly increasing the cost of manufacture. Attention is further called to the fact that although an effort has been made to show the manner in which the principles of my invention may be advantageously utilized in several types of wheel constructions, nevertheless, it is to be understood that no effort has been made to show all of the possible specific embodiments of my invention and, therefore, reservation is made to make such changes as may come within the purview of the accompanying claims.

What I claim as my invention is:

1. In a vehicle wheel, a hub, a pneumatic tire carrying rim supported from the hub, and a brake drum carried by the hub having an annular brake flange provided with an integral extension at the free edge thereof supporting an auxiliary road engaging portion adjacent the pneumatic tire carried by the rim.

2. In a vehicle wheel, a hub, a pneumatic tire carrying rim supported from the hub, and a brake drum carried by the hub and having an integral extension at the free edge of the brake flange supporting an auxiliary road engaging portion adjacent the pneumatic tire carried by the rim.

3. In a vehicle wheel, a hub, a pneumatic tire carrying rim supported from the hub, a brake drum carried by the hub and having an integral extension at the free edge of the brake flange projecting rearwardly beyond the rim, and a rim secured to the extension for supporting a pneumatic tire of less diameter than the tire carried by the rim aforesaid.

CHARLES S. ASH.